Dec. 31, 1963  W. HEINRICH  3,115,940
ROD WEEDER
Filed Aug. 3, 1961  2 Sheets-Sheet 1
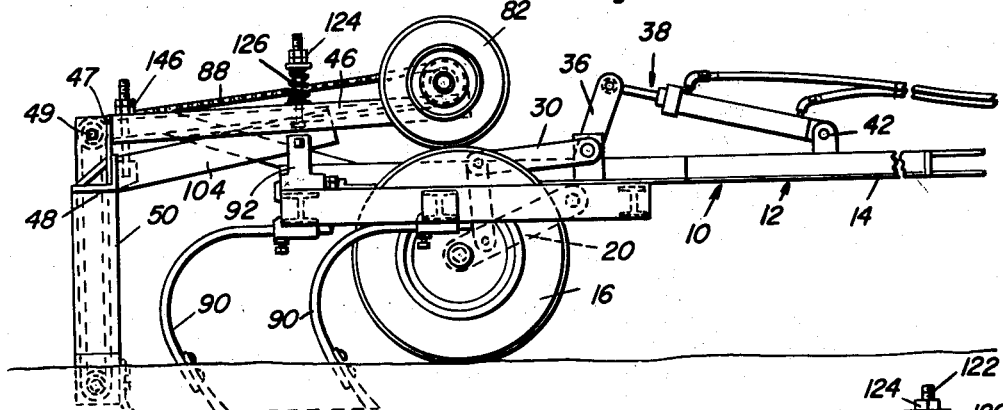
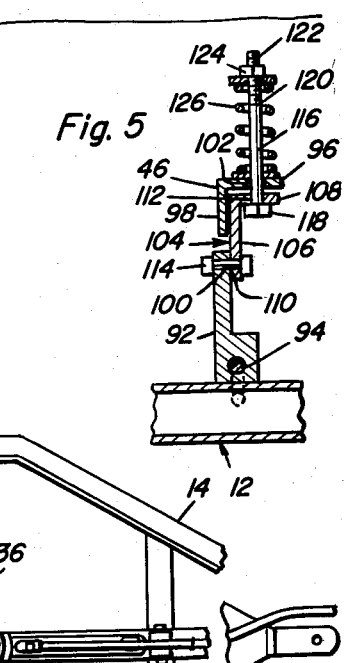
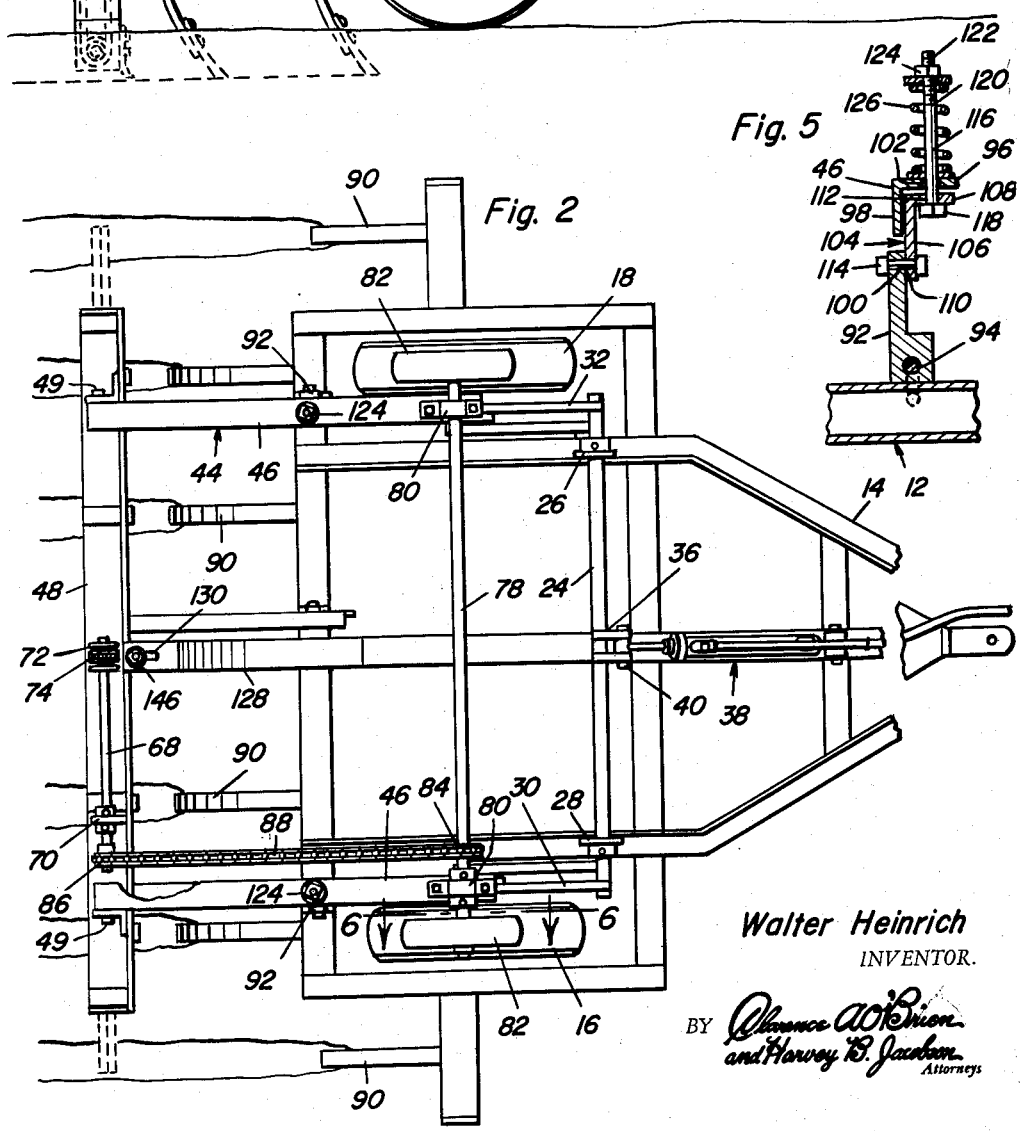
Walter Heinrich
INVENTOR.

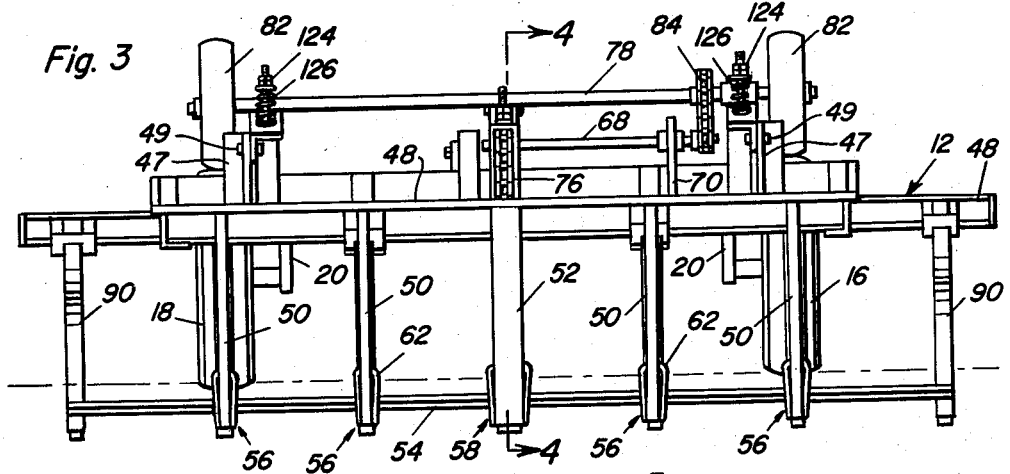
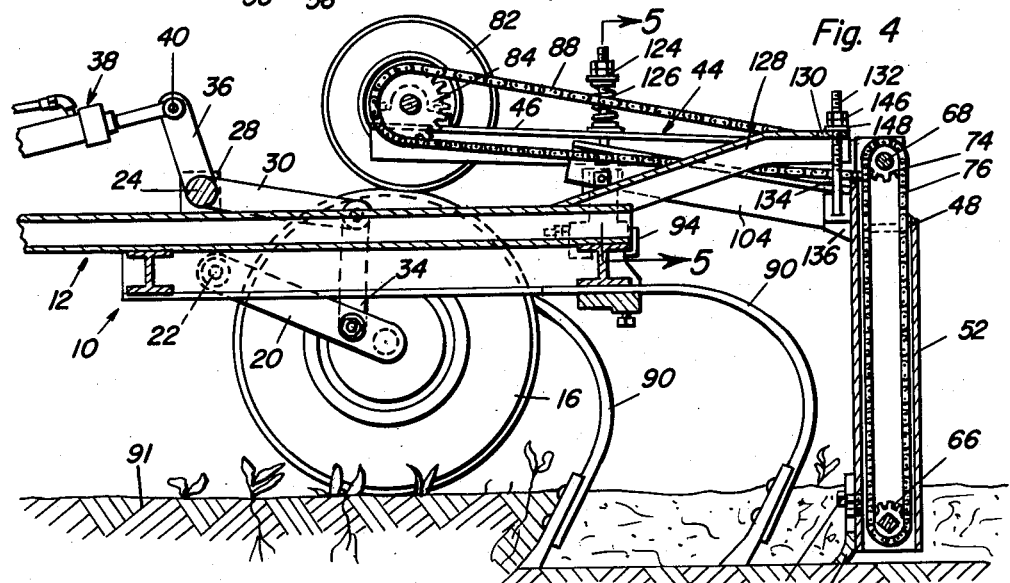
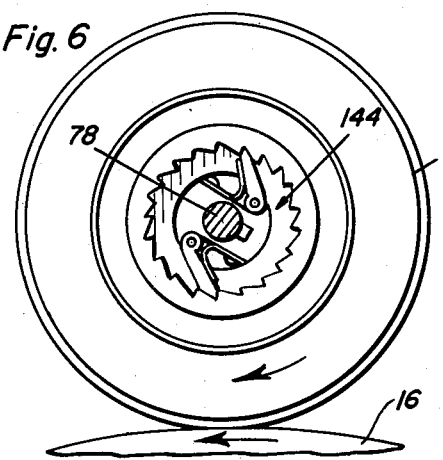
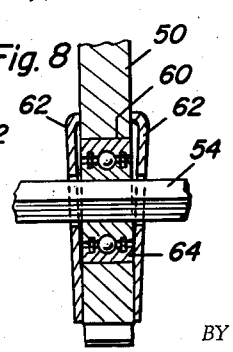
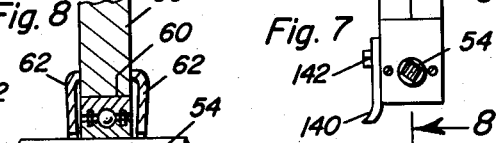
Walter Heinrich
INVENTOR.

United States Patent Office 3,115,940
Patented Dec. 31, 1963

3,115,940
ROD WEEDER
Walter Heinrich, Moccasin, Mont.
Filed Aug. 3, 1961, Ser. No. 129,169
6 Claims. (Cl. 172—44)

This invention relates to a novel and useful rod weeder attachment for cultivators and harrows.

Although the rod weeder of the instant invention is illustrated and described herein as being particularly well adapted for use in conjunction with cultivators and harrows of the spring tine-toothed type, the rod weeder may also be used in conjunction with other types of cultivators.

The rod weeder of the instant invention is constructed in a manner whereby a weeder rod is journalled for rotation about a substantially horizontally disposed axis and is mounted for movement between a first rearward upper position and a second downward forward position to the rear of the soil working implements carried by the cultivator to which the rod weeder is secured. The weeder rod is normally resiliently urged toward the second downward and forward position spaced immediately to the rear of the lower portions of the ground working implements carried by the cultivator to which the rod weeder is secured and is mounted in such a manner whereby the rod weeder may be deflected rearwardly and upwardly upon striking an object in the ground being worked which might otherwise cause damage to the rod weeder. The rod weeder is supported from the main frame of the cultivator in a manner whereby the weeder rod is mounted for rearward upward swinging movement independently of the ground working implements carried by the cultivator. In this manner, the rod weeder need not be constructed rigidly enough to withstand striking all objects which might be embedded in the ground being worked, inasmuch as the weeder rod, upon striking a large rock or similar object may be pivoted rearwardly and upwardly out of engagement of the ground being worked. Accordingly, the construction of the rod weeder need not be extremely heavy thus greatly reducing the cost of manufacture of the rod weeder. Further, inasmuch as the weeder rod is mounted for movement relative to the main frame of the cultivator which supports the soil working implements of the cultivator, the normal operation of the soil working implements is not interfered with upon upward and rearward swinging movement of the weeder rod upon striking an object such as a large rock.

The weeder rod is drivingly connected to a pair of friction wheels which are mounted for movement into and out of engagement with the ground engaging wheels of the cultivator to which the rod weeder is secured. In this manner, the weeder rod is drivingly connected to the ground engaging wheels of the cultivator to which it is secured.

The mounting means for the weeder rod includes means for normally resiliently urging the weeder rod toward a forwardmost and downwardmost ground working position and also includes adjustable stop means for limiting forward and downward movement of the weeder rod. Accordingly, the depth of the weeder rod relative to the depth of the ground engaging implements carried by the cultivator to which the rod weeder is secured may be adjusted as desired.

The main object of this invention is to provide a rod weeder which may be conveniently secured to different types of draft cultivators and mounted thereon whereby the weeder rod of the attachment may be mounted for movement into and out of engagement with the ground being worked independently of movement of the ground working implements carried by the cultivator into and out of engagement with the ground being worked.

A further object of this invention, in accordance with the immediately preceding object, is to provide a rod weeder including means for normally resiliently urging the weeder rod thereof to a lowermost position.

Still another object of this invention, in accordance with the preceding objects, is to provide means whereby the thrust effected by the urging means may be adjusted.

Still another object of this invention is to provide a rod weeder attachment for a cultivator in accordance with the preceding objects and including means for adjustably limiting penetration of the weeder rod of the attachment into the soil being worked.

A final object to be specifically enumerated herein is to provide a rod weeder which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a conventional type of wheeled cultivator to which the rod weeder of the instant invention is secured;

FIGURE 2 is a top plan view of the embodiment illustrated in FIGURE 1;

FIGURE 3 is a rear end elevational view of the embodiment illustrated in FIGURE 1 as seen from the left side thereof;

FIGURE 4 is a somewhat enlarged vertical transverse sectional view taken substantially upon the plane indicated by the section line 4—4 of FIGURE 3;

FIGURE 5 is an enlarged fragmentary vertical transverse sectional view taken substantially upon the plane indicated by the section line 5—5 of FIGURE 4;

FIGURE 6 is an enlarged fragmentary vertical longitudinal sectional view taken substantially upon the plane indicated by section line 6—6 of FIGURE 2;

FIGURE 7 is a fragmentary side elevational view of the lower end of one of the depending supports by which the weeder rod of the rod weeder attachment is rotatably journalled; and FIGURE 8 is an enlarged fragmentary transverse vertical sectional view taken substantially upon the plane indicated by section line 8—8 of FIGURE 7.

Referring now more specifically to the drawings the numeral 10 generally designates a conventional type of draft cultivator which includes a main frame generally referred to by reference numeral 12 having a drawbar forward end portion 14 adapted for securement to a draft implement. The main frame 12 includes a pair of ground engaging wheels 16 and 18 each journalled for rotation about an axis extending transversely of the main frame 12 and through the rear end of a crank arm 20 whose forward end portion is pivotally secured to the main frame as at 22. An operating shaft 24 is journalled for rotation from the main frame 12 and about an axis extending transversely of the main frame by means of journal supports 26 and 28. A pair of crank arms 30 and 32 are secured to the operating shaft 24 and each has a connecting link 34 pivotally connected between the free ends of the crank arms 30 and 32 and the corresponding crank arms 20. An operating lever 36 is also secured to the operating shaft 24 and projects radially outwardly therefrom. The free end of the operating lever 36 has one end of an extensible motor generally referred to by the reference numeral 38 pivotally secured thereto as at 40 and the other end of the extensible motor 38 is pivotally secured to the main frame 12 as at 42. In this manner, operation of the extensible motor 38 will cause the main frame 12 to be raised or lowered relative to the ground engaging wheels 16 and 18.

A sub-frame generally referred to by the reference numeral 44 and including a pair of longitudinally extending side frame members 46 is pivotally secured to the main frame 12 for movement about a generally horizontally disposed transversely extending axis in a manner which will hereinafter be more fully set forth. The rear ends of the side frame members 46 are interconnected by means of a rear transverse frame member 48 having rigid upstanding brackets 47 to which the side members 46 are pivotally secured by means of pivot fasteners 49 and a plurality of depending supports 50 and 52 depend from and are fixedly secured to the transverse frame member 48.

An elongated and transversely extending weeder rod 54 is journalled for rotation about an axis extending transversely of the cultivator 10 and through the lower end of the depending supports 50 and 52 by means of bearing assemblies generally referred to by the reference numerals 56 and 58 respectively. While the supports 50 may be of either tubular construction or solid, the support 52 is of tubular construction and includes a pair of transversely spaced bearings, (not shown) which rotatably journal the weeder rod 54. Each of the supports 50 is provided with a bearing opening 60 at its lower end and a pair of retaining plates 62 are secured to opposite sides of each of the lower end portions of the support 50 in order to retain a bearing 64 within the bearing opening 60. The bearings 64 also rotatably journal the weeder rod 54 and the retaining plates 62 are also designed to prevent the entrance of foreign material into the bearing 64.

The weeder rod 54 has a driven wheel 66 secured thereto between the pair of bearings (not shown) carried by the lower end of the support 52 and a transverse shaft 68 is journaled for rotation about an axis extending transversely of the sub-frame 44 by means of journals 70 and 72. The transverse shaft 68 has a drive wheel 74 secured thereto in alignment with the driven wheel 66 and an endless flexible member 76 is entrained over the drive and driven wheels 74 and 66. It will be noted that the axes of rotation of the side members 46 defined by the pivot fasteners 49 coincide with the axis of rotation of the shaft 68.

A drive shaft 78 is also journalled for rotation about an axis extending transversely of the sub-frame 44 by means of a pair of journals 80 carried by the forward ends of the side frame members 46. The opposite ends of the drive shaft 78 have a pair of friction wheels 82 secured thereto and a first sprocket wheel 84 is carried by the drive shaft 78 and is aligned with a second sprocket wheel 86 carried by the transverse shaft 68. An endless flexible member 88 is entrained over the first and second sprocket wheels 84 and 86 thereby drivingly connects the weeder rod 54 with the friction wheels 82.

It will be noted that the main frame 12 has a plurality of spring tine-toothed cultivators 90 secured thereto which depend from the main frame 12 and are adapted for engagement with the ground 91 at their lower ends.

With attention now directed to FIGURES 2 and 5 of the drawings it will be seen that the main frame 12 includes a pair of pivotal supports 92 which are secured to the main frame 12 by means of clamp assemblies 94, see also FIGURE 4. Each of the side frame members 46 is generally L-shaped in cross section and includes an upper horizontal flange 96 and an upstanding lower flange 98. The pivot supports 92 are each apertured as at 100 and the upper horizontal flanges 96 are each apertured as at 102. An L-shaped support 104 including a vertical flange 106 and a horizontal flange 108 has its forward end secured between each of the pivotal supports 92 and the corresponding side frame member 46. Each of the vertical flanges 106 is apertured as at 110 and each of the horizontal flanges 108 is apertured as at 112. A pivot fastener 114 is secured through each pair of aligned apertures 100 and 110 and a threaded fastener 116 is secured through each pair of aligned apertures 102 and 112. The threaded fastener 116 has an enlarged head portion 118 engaged with the undersurface of the flange 108 and an elongated shank 120 whose end remote from the head portion 118 is externally threaded as at 122 and has a nut 124 engaged therewith. A compression spring 126 encircles the shank 120 and is disposed between the corresponding flange 96 and the associated nut 124. In this manner, each of the side frame members 46 is pivotally secured to the main frame 12 and yet is mounted for movement vertically along shank 120 of fastener 116 relative to the axis of rotation of the sub-frame defined by the pivot fasteners 114. The rear ends of the supports 104 are rigidly secured to the rear transverse frame member 48 in any convenient manner.

Accordingly, it may be seen that the compression springs 126 yieldably urge the friction wheels 82 into driving engagement with the ground engaging wheels 16 and 18 after the main frame 12 has been lowered for bringing the wheels 82 into engagement with wheels 16 and 18 while simultaneously urging the weeder rod forwardly and downwardly into engagement with the ground 91. Further, since the frame members 46 carrying the wheels 82 are mounted for limited vertical movement relative to pivot fastener 114, the supports 104, the rear transverse frame members 48, the depending supports 50 and 52 which are all rigid with each other, as well as the weeder rod 54 may be kicked rearwardly and upwardly about pivot fasteners 114 as springs 126 are compressed which would occur if the supports 50 and 52 or the weeder rod 54 strikes a buried object such as a rock without disengaging the wheels 82 from engagement with the wheels 16 and 18 and without appreciably increasing the frictional engagement of the wheels 82 with the wheels 16 and 18.

The main frame 12 also has a rearwardly extending support arm 128 secured thereto at its forward end in any convenient manner such as by welding and the rear end of the support arm 128 is provided with an enlarged opening 130 which loosely and slidably receives the threaded shank portion 132 of an abutment stop shaft 134 which is secured to the support 52 in any convenient manner such as by brace 136.

A tine point 140 is adjustably secured to each of the supports 50 and 52 by means of suitable fasteners 142, see FIGURES 4 and 7. In addition, it will be noted that each of the friction wheels 82 includes a ratchet assembly generally referred to by the reference numeral 144 whereby the drive shaft 78 is driven by the friction wheel 82 which is rotating at the highest speed.

In operation, the extensible motor 38 may be actuated to raise and lower the main frame 12 relative to the ground engaging wheels 16 and 18 in order to lower the tines 90 into the ground 91. Then, the nuts 146 and 148 threadedly engaged with the threaded shank portion 132 may be adjusted in order to limit downward movement of the rear end of the sub-frame 44. The nut 124 may then be adjusted to increase or decrease the tension of the compression spring 126 in order to afford the desired thrust to urge the weeder rod 54 forwardly and downwardly and the friction wheels 82 into engagement with the ground engaging wheels 16 and 18. If any depending portion of the rod weeder should strike a large object such as a rock, the lower ends of the supports 50 and 52 will be pivoted rearwardly and upwardly free of the obstruction without disrupting the frictional drive established between the ground engaging wheels 16 and 18 and the weeder rod 54 and also without disrupting operation of the tines 90.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a draft type cultivator of the type including a main frame having a plurality of ground engaging wheels movably mounted on said frame for adjustably vertically positioning said main frame relative to the ground surface and a plurality of depending soil working implements adapted to work the ground over which said cultivator is being pulled, a rod weeder attachment comprising a weeder rod, means mounting said rod from said main frame for rotation about a generally horizontal disposed axis extending transversely of said main frame and for swinging movement between a first rearward upper position and a second downward forward position, said mounting means including means normally resiliently urging said weeder rod toward said second position, adjustable limit means supported from said main frame and engageable with said mounting means for limiting movement of said weeder rod toward said second position, and friction drive means supported from said mounting means and drivingly connected to said weeder rod and frictionally engaged with at least one of said ground engaging wheels, said urging means also being operatively connected to said drive means and normally resiliently urging said drive means into driving engagement with at least said one ground engaging wheel.

2. The combination of claim 1 wherein said mounting means comprises a generally horizontally disposed sub-frame pivotally secured to said main frame for movement about an axis extending transversely of said main frame and spaced between the forward and rear ends of said sub-frame, said weeder rod being supported from one end portion of said sub-frame and said drive means being supported from the other end of said sub-frame.

3. The combination of claim 2 wherein said mounting means includes a side frame member pivotally attached to the sub-frame, said frame member carrying said drive means and engaged by said urging means for retaining the drive means engaged with the ground engaging wheel.

4. The combination of claim 3 wherein the rear end of said sub-frame includes a plurality of depending supports, said weeder rod being journalled for rotation from the lower ends of at least two of said supports, one of said two supports comprising a tubular member, a driven wheel secured to said weeder rod and disposed in said tubular member, a transverse shaft journalled from the rear of said sub-frame for rotation about a horizontally disposed axis entending transversely of said tubular member and including a drive wheel aligned with said driven wheel, and an endless flexible member entrained over said drive and driven wheels, said drive means including means operable for drivingly connecting at least said one ground engaging wheel with said transverse shaft.

5. The combination of claim 4 wherein said last mentioned means includes a drive shaft journalled from and for rotation about a generally horizontally disposed axis extending transversely of the forward end portion of said side frame member and including a first sprocket wheel aligned with a second sprocket wheel carried by said transverse shaft, an endless flexible member entrained over said first and second sprocket wheels, said drive means including a drive shaft having a friction wheel mounted thereon aligned with and frictionally engaged with said one ground engaging wheel.

6. The combination of claim 4 wherein said drive means includes a drive shaft having a pair of friction wheels movable into and out of frictional engagement with two of said ground engaging wheels.

References Cited in the file of this patent

UNITED STATES PATENTS

| 1,071,493 | Woodrom | Aug. 26, 1913 |
| 1,854,902 | Johansen | Apr. 19, 1932 |
| 2,614,475 | Mowbray | Oct. 21, 1952 |
| 2,892,504 | Mowbray | June 30, 1959 |